United States Patent [19]

Jyojiki et al.

[11] 4,171,155
[45] Oct. 16, 1979

[54] METHOD AND APPARATUS FOR FOCUSING A PHOTOGRAPHIC APPARATUS

[75] Inventors: Masao Jyojiki, Saitama; Kazuo Nakamura, Asaka, both of Japan

[73] Assignee: Asahi Kogaku Kogyo Kabushiki Kaisha, Japan

[21] Appl. No.: 887,662

[22] Filed: Mar. 17, 1978

[30] Foreign Application Priority Data

Mar. 18, 1977 [JP] Japan .................................. 52-29970

[51] Int. Cl.² .............................................. G03B 7/08
[52] U.S. Cl. .............................................. 354/25; 354/31
[58] Field of Search ............... 354/25, 31, 60 A, 195, 354/198, 199; 352/140; 355/56

[56] References Cited

U.S. PATENT DOCUMENTS 3,596,101  7/1971  Someya et al. ................ 352/140 X
4,083,056  4/1978  Nakamura et al. ............ 354/53 X Primary Examiner—Michael L. Gellner
Attorney, Agent, or Firm—Steinberg & Blake

[57] ABSTRACT

The photographic apparatus has an objective and device for determining when the objective has focused an image in a predetermined plane. This device has an optical system having along its optical axis an image plane normal to the optical axis in which a given image is situated when the objective has properly focused an image corresponding to the given image in the above predetermined plane. The optical system has along its optical axis, spaced from the imaged plane, a detecting plane which is normal to the optical axis and the optical system includes in the detecting plane a pair of identical elongated photosensitive detecting units which respectively have optically equivalent positions with respect to the optical axis. Each of these units provides an output which varies as an image is moved longitudinally therealong. An optical structure in the form of two pairs of spaced prism means is situated along the optical axis between the image plane and the detecting plane for transmitting, when the given image is in the image plane, a pair of identical separate images, each of which is derived from the given image, respectively to identical positions along the pair of detecting units, and the optical structure displaces the identical images transmitted to the pair of detecting units respectively in opposite directions along the pair of detecting units as the given image is displaced with respect to the image plane so that the outputs can be compared to determine the location of the pair of images on the respective detecting means.

14 Claims, 17 Drawing Figures

METHOD AND APPARATUS FOR FOCUSING A PHOTOGRAPHIC APPARATUS

BACKGROUND OF THE INVENTION

The present invention relates to photographic apparatus and in particular to a method and device for determining when an objective of the photographic apparatus has properly focused an image in a predetermined plane.

It has already been proposed to detect proper or improper focusing from the knowledge that various factors such as contrast, spatial frequency, and luminance of an object to be photographed will vary in accordance with the extent of precision of the focusing. One of the known methods utilizes photoconductive elements such as cadium sulfide elements having specific contrast-responsive characteristics. Another type of known system utilizes a photoelectric output signal obtained by oscillating or rotating an optical member in a mechanical manner. Also it is known to utilize two outputs from two sets of photo-detecting members arranged at different positions, as in known so-called coupled range-finder cameras.

However, the method utilizing the contrast-responsive characteristics of cadium sulfide elements is disadvantageous in that it is difficult to prepare these elements in such a way that they have a uniform photoresponsive characteristic. Thus the output variations of such photoconductive elements before and after the properly focused setting is too low for achieving an exact detection insofar as detecting of proper focusing at a relatively low luminance intensity is concerned.

With respect to the second method utilizing a mechanically movable oscillating or rotating optical member, there is the considerable disadvantage that mechanically movable parts are of considerable size so that the desired miniaturization of a camera or other photographic apparatus cannot be achieved, and at the same time such constructions have an undesirably great power requirement.

The third of the above solutions utilizing two outputs from two sets of photo-detective members is of considerable disadvantage in that exchange of lenses with such systems is extremely difficult to carry out.

SUMMARY OF THE INVENTION

It is accordingly a primary object of the present invention to provide a method and apparatus which will avoid the above drawbacks.

Thus, it is an object of the present invention to provide a method and apparatus which are completely practical for the purpose of detecting when an optical system is properly focused.

In addition, it is the object of the present invention to provide a method and apparatus which will meet requirements such as miniaturization of an optical system, maintaince of high precision, satisfactory operation at low luminance or light intensity, and the use of only a relatively low power to achieve the desired operation.

The basic concept of the invention resides in improving a photoelectric focusing detector utilizing a focus adjusting structure which has a split prism.

In accordance with the invention a photographic apparatus has an objective and a device for determining when the objective has focused an image in a predetermined plane. This device includes an optical system having a single optical axis extending only along a single straight line, this optical system having along its optical axis an image plane which is normal to the optical axis and in which a given image is situated when the objective has properly focused an image corresponding to the given image in the above predetermined plane. The optical system has along its optical axis spaced from the above image plane a detecting plane which is also normal to the optical axis, and in this detecting plane there are a pair of identical elongated photosensitive detecting means which respectively have optically equivalent positions with respect to the optical axis. Each detecting means provides an output which varies as an image moves longitudinally therealong. An optical means is situated along the optical axis between the image plane and detecting plane for transmitting, when the given image is in the image plane, a pair of identical separate images, each of which is derived from the given image, respectively to identical positions along the pair of detecting means. The optical means displaces the identical images transmitted to the pair of detecting means respectively in opposite directions along the pair of detecting means as the given image is displaced with respect to the image plane. Thus when the outputs of the pair of detecting means are different, the given image is not in the image plane, so that the output of the pair of detecting units will be different if the given image is before or behind the above image plane along the optical axis while the outputs will be the same if the given image is situated in the image plane. A suitable indicating structure is operatively connected with the pair of detecting units for indicating when the identical images are respectively situated at identical positions or therealong.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
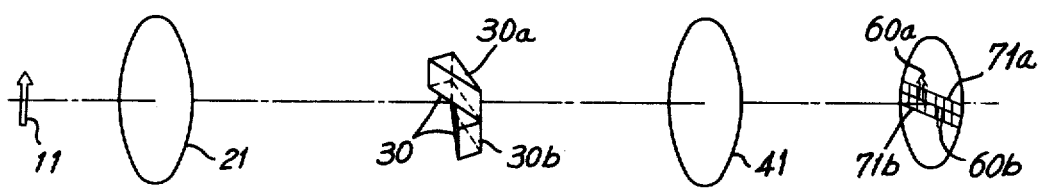
FIG. 1 is a schematic representation of a known prior art system for detecting accuracy of focusing.

In the several figures parts having the same functions are designated by the same reference characters.

In order to afford a better understanding of the invention, FIG. 1 illustrates an optical system incorporated into a known focusing detector. With this known arrangement of FIG. 1, separated image portions 60a and 60b are obtained by a split prism 30 situated at the focal plane of the objective 21. Thus the objective 21 provides an image of the object 11, and this image is split by the prism portions 30a and 30b of the prism 30 to provide the separated image portions which are projected by a projector lens 41 onto a pair of elongated detecting means formed respectively by trains 71a and 71b of photoconductive elements. When the two separated image portions 60a and 60b coincide, an indication is provided that proper focusing has been achieved. At the moment when proper focusing has thus been achieved, the output difference of the trains of photoconductive elements 71a and 71b becomes zero. Thus, the known arrangement of FIG. 1 indicates coincidence of the separated upper and lower image portions in an electronic manner.

Figure 2A:
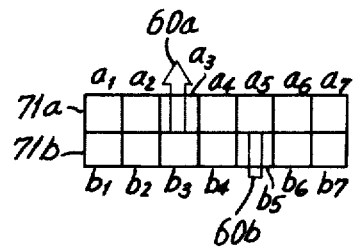
FIGS. 2a and 2b respectively illustrate how the prior art system of FIG. 1 operates.
Figure 2B:
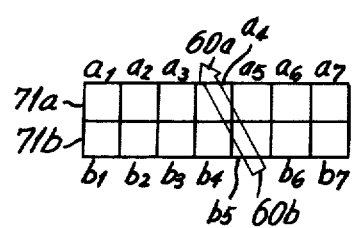

As may be seen from FIGS. 2a and 2b, the respective elements of the photoconductive element train 71a provides respective outputs at the several photoconductive elements $a_1$-$a_7$ thereof, while the elements $b_1$-$b_7$ of the train 71b also provide respective outputs. In the event that proper focusing has not been provided, then the arrangement will be, for example, as shown in FIG. 2a. Thus in this case the split prism 30 causes the separate image portions 60a and 60b to be spaced from each other along the pair of photoconductive trains 71a and 71b, as shown by way of example in FIG. 2a. This lack of proper focusing is expressed by $$\sum_{k=1}^{7} \left| a_k - b_k \right| \neq 0. \quad (1)$$

When proper focus has been achieved, however, the upper and lower image portions indicated in FIG. 2a coincide with each other, as expressed by $$\sum_{k=1}^{7} \left| a_k - b_k \right| = 0 \quad (2)$$

Thus, the point of proper focusing can be detected by determining the difference between the outputs of the photoconductive trains 71a and 71b.

With the known construction of FIG. 1, however, the difference between the outputs of the pair of detecting means 71a and 71b still will not be zero, as indicated in formula (1) above, even if the upper and lower image portions are brought into coincidence, which is to say even if proper focusing has been achieved. It is possible for this false indication of improper focusing to result with the known construction in the event that the object from which the image is derived is of an elongated configuration and is in an inclined attitude. Under these circumstances the image portions will extend in inclined manner across the photoconductive elements, in the manner indicated in FIG. 2b. Thus in the event that an elongated object image extends in an inclined manner across the boundary line between the prisms 30a and 30b of the split prism 30, the result will be as illustrated in FIG. 2b according to which even though proper focusing has been achieved, the part of the detecting means 71a which receives part of the image is different from the part of the detecting means 71b which receives the remainder of the image. Thus since under the conditions illustrated in FIG. 2b the coinciding image portions nevertheless are detected by parts of the pair of detecting means 71a and 71b which are different from each other and which do not correspond to each other, the outputs of the pair of detecting means 71a and 71b will be different from each other, so that the difference therebetween still will not be zero, and under these circumstances an indication will be given that proper focusing has not been achieved even though in fact proper focusing has been achieved.

It is thus impossible with the known structure to achieve an exact electronic detection of the adjustment of the focus with photoconductive element trains as illustrated in FIGS. 1, 2a, and 2b.

It is to be noted in addition, that the same drawbacks are present when the adjustment of focus is carried out while the hand of the operator trembles, inasmuch as a condition as illustrated in FIG. 2b where proper focus adjustment is not indicated is also possible instantaneously due to vibrations or trembling even in the case where the image portions are oriented as shown in FIG. 2a and are brought into coincidence.

The above drawbacks of the known construction result basically from the fact that the two trains of photoconductive elements which form the pair of detecting means 71a and 71b are respectively separately exposed to two different portions of a single object image.

In order to avoid this drawback, in accordance with the invention the image of the object is split into two identical images to which the two trains of photoconductive elements are respectively exposed, and focusing can be detected depending upon whether there is a difference in the outputs of the two trains of photoconductive elements.

In order to split an image of a single object into two or more identical images, it has been customary to use a semitransparent mirror. However, the use of such a mirror as an image splitter in a focusing detector is of considerable disadvantage. In the first place, the optical axis is split into two or more axes, and the resulting construction becomes undesirably large. In the second place, the luminous flux or light rays which come from the object to be photographed become polarized by semitransparent mirror, and as a result the two split images often differ in their light intensity of luminance. In the third place it is technically difficult to manufacture a semitransparent mirror with transmission, reflection and splitting characteristics which are predetermined with sufficient accuracy to meet the essential requirement that there should be no luminance difference between the two images which are derived by splitting the image which is transmitted to the semitransparent mirror. In the fourth place, the ability for detecting proper focus at a relatively low light intensity or luminance is relatively small inasmuch as the semitransparent mirror is a source of considerable loss of luminance. Finally, utilizing a semitransparent mirror renders it difficult to situate a pair of photoconductive element trains at positions which are optically equivalent to each other.

For the reasons set forth above it is from a practical standpoint inexpedient to utilize a semitransparent mirror in order to split an object image and utilize the pair of images derived from such splitting for purposes of comparing the luminance thereof in order to achieve the desired detection of focusing.

In contrast, the focusing device of the present invention is characterized by the manner in which the object image is split without utilizing a semitransparent mirror having the above disadvantages, while at the same time with the present invention an exact detection of focusing is reliably achieved.

Figure 3:
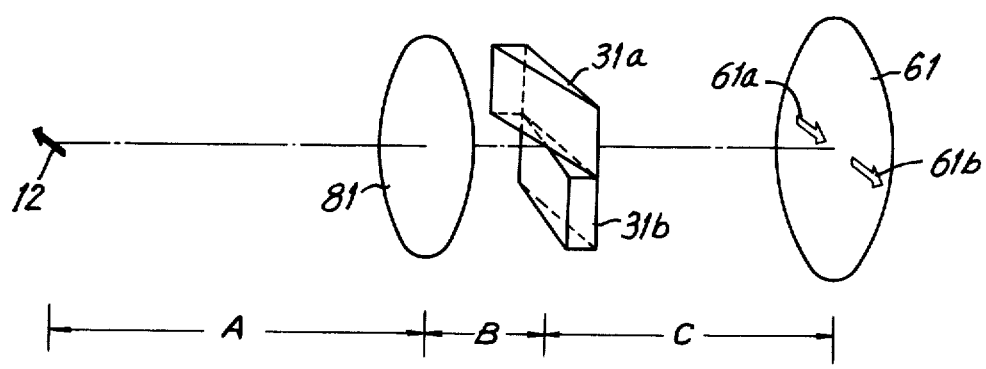
FIG. 3 is a schematic illustration of a principle of the present invention.

FIG. 3 illustrates part of the structure of the invention, the part illustrated in FIG. 3 operating to derive from one image a pair of identical images corresponding thereto. Thus, FIG. 3 shows a relay lens means 81 located along the illustrated optical axis in a path of light between an object 12, such as an object to be photographed, and a plane 61 in which secondary images of the object 12 are formed. The structure of FIG. 3 includes a refracting means formed by the split prism assembly which includes the prisms 31a and 31b situated along the optical axis in the path of light travel from the relay lens means 81 toward the secondary image formation plane 61. The prisms 31a and 31b are identical but their pointed ends are oppositely arranged so that the pair of prisms 31a and 31b are oppositely directed in the manner illustrated. Thus the sharp substantially linear ends of the prisms are directed toward the right and left, respectably, as viewed in FIG. 3.

Figure 4A:
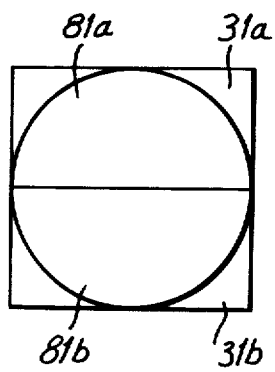
FIG. 4a shows the arrangement of FIG. 3 as seen from the left of FIG. 3.

FIG. 4a shows how the structure of FIG. 3 appears when looking along the optical axis toward the relay lens means 81. Thus the prisms 31a and 31b are shown as they appear behind the relay means 81 in FIG. 4a. The light rays or luminous flux traveling through the upper half 81a of the relay means 81 travels through the upper prism 31a, while the light rays or luminous flux traveling through the lower half 81b of the relay means 81 passes through the lower prism 31b. The pair of prisms 31a and 31b certainly reduce luminance of the object image by half, but at the same time the image is split into a pair of perfectly identical images.

Figure 4B:
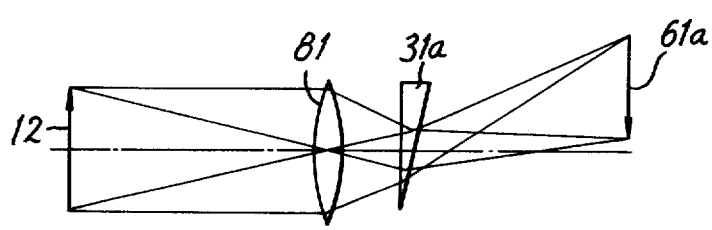
FIG. 4b illustrates how the structure of FIG. 3 operates to form an image at the upper part of the structure of FIG. 3.
Figure 4C:
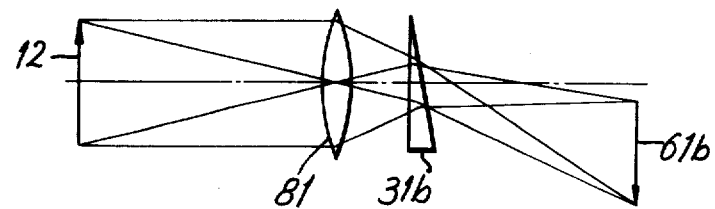
FIG. 4c illustrates how the structure of FIG. 3 operates at a lower part of FIG. 3 to form an image.

Thus, with this arrangement the light rays or luminous flux traveling from the object 12 is utilized to form with the illustrated structure two images 61a and 61b which are identical and separated from each other, having with respect to each other the in-line arrangement shown in FIG. 3 at the plane 61. FIG. 4b illustrates how the light rays travel through the relay lens means 81, at the upper portion 81a thereof, and through the upper prism 31a to form image 61a. FIG. 4c shows how the light rays travel through the relay means 81 at the lower portion 81b thereof to travel therefrom through the lower prism 31b to form the completely seperate image 61b of the object 12, this latter image 61b of the object 12 being completely distinct from but identical with the image 61a of the object 12.

Referring to FIG. 3, it will be seen that the relay lens means 81 is situated at the distance A from the object 12, while the split prism means or refracting means 31a,31b of FIG. 3 is situated at the distance B from the relay lens means 81, and the image forming plane 61 is situated at the distance C from the refracting means 31a, 31b. Assuming that the relay lens 81 has a focal length or distance $f_{(81)}$ while the prisms 31a, 31b respectively have refraction angles $a_{31a}$, $a_{31b}$, respectively, then the pair of images 61a, 61b are formed in the image plane 61 at a spacing from each other of C (tan $a_{31a}$ + tan $a_{31b}$). These images 61a, 61b respectively occupy positions which are optionally equivalent to each other. Furthermore, the illustrated arrangement conforms to the relationship expressed by $$1/A + 1/(B+C) = 1/f_{(81)} \qquad (3).$$

The split prisms 31a and 31b each may comprise a plurality of unit prisms having different refraction characteristics or refractive directions, these unit prisms being cemented together so as to reduce chromatic dispersion.

Figure 5:
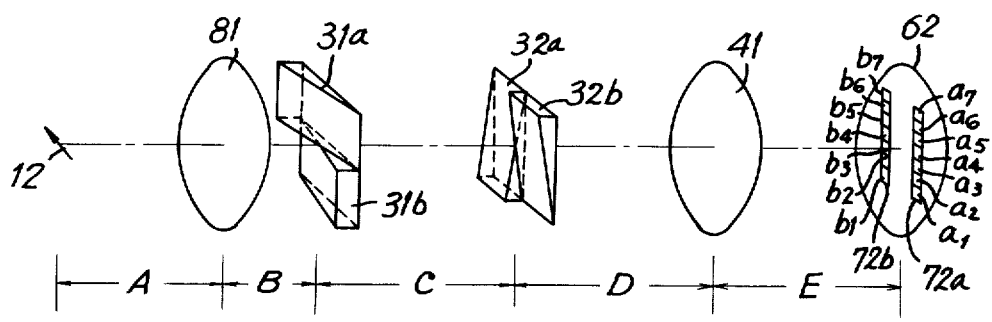
FIG. 5 is a schematic representation of one possible device of the invention operating according to the principle illustrated in FIG. 3.

FIG. 5 schematically illustrates one possible embodiment of a focusing detector according to the present invention. The arrangement of FIG. 5 includes the relay lens means 81, as well as the pair of prisms 31a, 31b, the relay lens means 81 and refracting means formed by the prisms 31a and 31b being identical with those of FIG. 3. With the structure shown in FIG. 5, however, at the image forming plane 61 of FIG. 3 there is a second refracting means formed by a second set of prisms 32a and 32b. Thus the refracting prisms 32a and 32b are situated at the image forming plane of the prisms 31a and 31b, and these prisms 32a, 32b may be substantially identical with the prisms 31a, 31b but are oriented with respect thereto so as to be turned through 90° about the optical axis with respect to the prisms 31a, 31b, as illustrated in FIG. 5. Thus the refractive directions of the second set of prisms 32a, 32b are deviated from those of the first set of prisms 31a, 31b by 90° respectively. The projector lens means 41 is located in the path of light travel beyond the prisms 32a, 32b, this projector lens means 41 projecting the identical images onto the detecting plane 62. This detecting plane 62 is an image forming plane where a pair of elongated detector means 72a and 72b are situated, as illustrated. Thus it will be seen that the prisms 32a and 32b are arranged in such a way that their respective sharp edges are respectively directed in opposite directions.

The pair of detecting means 72a and 72b are in the form of trains of photoconductive elements arranged vertically, as illustrated in the image forming plane 62.

The distances A, B, and C of FIG. 5 correspond to the distances A, B and C of FIG. 3. In FIG. 5, the projector lens means 41 is situated along the optical axis at the distance D from the plane of the prisms 32a, 32b, while the detecting plane 62 is situated at the distance E from the plane occupied by the projector lens means 41. Inasmuch as the prisms 32a,32b are situated at a location corresponding to the plane 61 of FIG. 3 for receiving secondary images, the plane 62 can be considered as receiving tertiary images. Thus the pair of elongated photoconductive detecting means 72a, 72b are situated at the distance E from the projector lens means 41. This projector lens means 41 has a focal length or distance of $f_{(41)}$. With the arrangement of FIG. 5 there is the relationship as expressed by $$1/D + 1/E = 1/f_{(41)} \qquad (4).$$

Thus two secondary images of the object are formed by the relay lens means 81 and the split prisms 31a, 31b at the plane of the split prisms 32a, 32b, and these secondary images are projected as tertiary images by the projector lens means 41 onto the pair of photosensitive elongated detecting means 72a, 72b.

The detecting means 72a is made up of a train of photoconductive elements $a_1$-$a_7$ while the detecting means 72b is made up of a train of photoconductive elements $b_1$-$b_7$. All of these photoconductive elements have identical shapes and areas and form corresponding pairs of photoconductive elements such as the pair $a_1$ and $b_1$, $a_2$ and $b_2$, ... $a_7$ and $b_7$, their pairs respectively having there components in positions which are optically equivalent to each other, respectively. Thus these photoconductive elements are linearly arranged in two trains. When the conditions called for by the formulae (3) and (4) are established, the respective pairs of photoconductive elements $a_1$ and $b_1$, $a_2$ and $b_2$, etc. detect identical images, respectively.

With an arrangement as shown in FIG. 5, the adjustment of focus will normally be carried out in the usual manner by advancing or retracting the objective with respect to the object which is to be photographed, assuming a practical application of the invention to use with a photographic camera or the like. However, for the purpose of explaining the invention, a particular case is considered where for convenience in explanation the focal point of the objective is considered to be fixed and instead it is the object which is to be photographed which is displaced with respect to the objective along the optical axis. In such a case the plane in which the secondary images are formed by the relay lens means 81 and the prisms 31a and 31b is displaced with respect to the plane occupied by the prisms 32a, 32b along the optical axis. From the above formula (3), this displacement of the secondary image formation plane relative to the prisms 32a, 32b may be expressed by $$\{1/(A+l) - 1/f_{(81)}\}^{-1} - (B+C) \quad (5)$$

where $l$ represents the displacement of the object to be photographed. When the location of image formation along the optical axis is thus displaced relative to the split prisms 32a,32b the resultant images are deviated by these prisms 32a,32b in a proportion in accordance with the solution of the above formula (5).

Figure 6A:
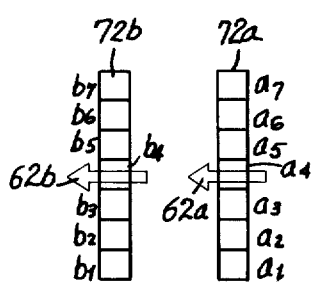
FIGS. 6a-6e respectively illustrate how the device of FIG. 5 operates.

FIGS. 6a-6e illustrate the pair of elongated detecting means formed by the trains 72a, 72b of the photoconductive elements with FIGS. 6a-6e also showing the identical images 62a, 62b which are respectively projected onto the pair of elongated identical detecting means 72a,72b. The object image 62a is deviated or refracted by the prisms 32a by an amount $$\Delta\chi \tan \alpha_{32a} \quad (6)$$

where $\Delta\chi$ represents the solution of the formula (5). If $\Delta\chi$ is adequately small relative to D and E, deviation along the associated train of photoconductive elements may approximately be given as $\Delta\chi \tan \alpha_{32a} E/D$. Thus, the images 62a, 62b projected by the projector lens means 41 onto the trains of photoconductive elements, respectively, will become vertically aligned with each other on these trains 72a, 72b in the manner shown in FIG. 6a in the case where the secondary image formation plane coincides with the plane occupied by the prisms 32a, 32b. The respective pairs of photoconductive elements $a_1$ and $b_1$, $a_2$ and $b_2$, etc. take positions which are optically equivalent to each other, respectively, with respect to the object which is to be photographed, and thus the images 62a,62b are optically identical to each other. When these images 62a,62b are projected equally onto each pair of corresponding photoconductive elements as shown in FIG. 6a, a sum of absolute values of the output differences $a_1-b_1$, $a_2,-b_2$, etc. of the respective pairs of photoconductive elements becomes zero, namely, $$\sum_{k=1}^{7} \left| a_k - b_k \right| = 0.$$

Figure 6B:
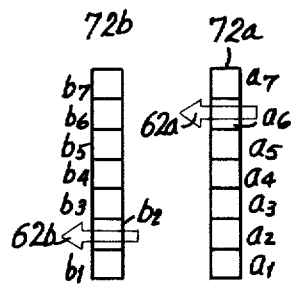
Figure 6C:
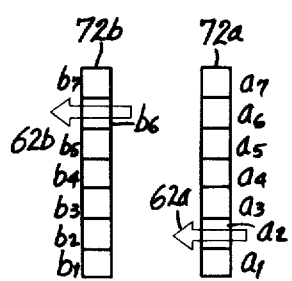

If, however, in the above example the secondary image formation plane is not in coincidence with the plane occupied by the prisms 32a,32b, then the images at the pair of identically elongated detecting means formed by the photoconductive element trains 72a,72b are also out of vertical alignment as seen, or example, in FIG. 6b and FIG. 6c, and the sum of absolute values in this case is not zero namely, $$\sum_{k=1}^{7} \left| a_k - b_k \right| \neq 0.$$

The situation shown in FIG. 6b may be considered as illustrative of a condition where the secondary image formation plane is before the plane occupied by the prisms 32a, 32b, and the condition illustrated in FIG. 6c may be considered as illustrating the situation where this secondary image formation plane is situated behind the plane occupied by the prisms 32a, 32b.

Figure 6D:
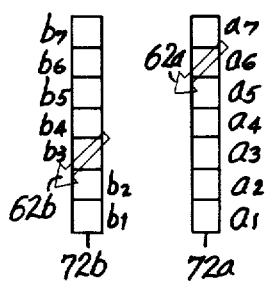
Figure 6E:
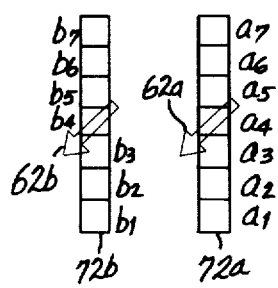

Considering now another situation where the object which is to be photographed is elongated and inclined with respect to the elongated photosensitive detecting means 72a,72b, then when the secondary image formation plane does not coincide with the plane occupied by the prisms 32a, 32b, the slanting images 62a,62b received by the pair of photosensitive detecting means 72a,72b are out of vertical alignment with each other as illustrated in FIG. 6d, for example, so that in this case the absolute sum of the output differences of the respective pairs of corresponding photoconductive elements is not zero. However, when, in this case the secondary image formation plane does coincide with the plane occupied by prisms 32a,32b, the identical images 62a,62b are projected in precisely the same way onto the pair of detecting means 72a,72b, occupying identical positions therealong as illustrated in FIG. 6e. Thus in this latter case the absolute sum of the output differences of the respective pairs of corresponding photoconductive elements becomes zero.

In consequence, $$\sum_{k=1}^{7} \left| a_k - b_k \right| = 0$$

in the properly focused condition while $$\sum_{k=1}^{7} \left| a_k - b_k \right| \neq 0$$

in an incorrectly focused condition, insofar as the relay lens means 81 is considered as being utilized as the objective and the split prisms 32a,32b are situated in a plane which is the equivalent of the film plane. Thus, such a relationship may be utilized for detecting whether or not proper focus has been achieved.

Figure 7A:
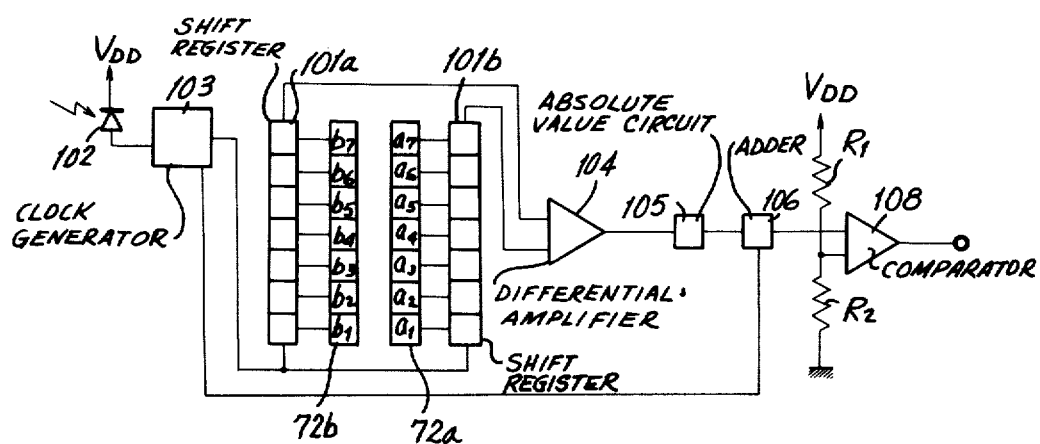
FIG. 7a is a schematic representation of a pair of elongated detecting means of the invention and an indicating means operatively connected thereto.

Referring to FIG. 7a, there is illustrated therein an electrical processing circuit operatively connected with the pair of elongated photosensitive detecting means 72a, 72b, this electrical circuitry forming an indicating means operatively connected with the pair of detecting means 72a, 72b, for indicating when proper focus has been achieved. The circuitry shown in FIG. 7a provides $$\sum_{k=1}^{7} \left| a_k - b_k \right|$$

as its output and includes a photosensitive means in the form of a photoconductive element 102 which responds to light for providing an output. Electrically connected with the photosensitive means 102 is a clock generator 103 which receives the output from the photoconductive element 102 and operates to modulate the clock frequency in accordance with the luminance or light intensity of an object which is to be photographed, so as to maintain in this way a predetermined output level. The illustrated circuitry includes a differential amplifier 104 and two analog shift registers 101a, 101b which are operatively connected to the clock generator 103 so as to be driven by the output thereof, these shift registers 101a, 101b being also electrically connected to the differential amplifier 104 for applying signals to the two inputs of the differential amplifier 104, as illustrated. The pair of photoconductive element trains 72a, 72b are connected to the analog shift registers 101a, 101b, respectively, in the manner illustrated. An absolute value circuit means 105 receives the output from the differential amplifier 104 and converts this output into a corresponding absolute value. An adder means 106 performs an addition of the output from the absolute value circuit means 105 in synchronism with the clock generator 103 to which the means 106 is also electrically connected as illustrated. A comparator means 108 has two inputs one of which is supplied with a constant voltage and the other of which receives the output from the adder means 106. In the illustrated example the shift registers 101a, 101b are composed of charge transfer elements and the outputs thereof are arranged in such a way that outputs equivalent to the photo-outputs of the respective pairs of photoconductive elements may be simultaneously generated. The output of the differential amplifier 104 corresponds to the difference $a_k - b_k$ (k = 1, 2, . . . , 7) which is converted by the absolute value circuit means 105 into $|a_k - b_k|$. Then, the adder means 106 provides at its output $$\sum_{k=1}^{7} \left| a_k - b_k \right|.$$

The output of the comparator 108 is an inverse output when the output voltage of the adder 106 drops below $V_{DD} \cdot R_2/(R_1 + R_2)$, and then provides a signal indicative of proper focusing, where $V_{DD}$ represents the source voltage and $R_1$, $R_2$ represent resistance values, respectively.

Figure 7B:
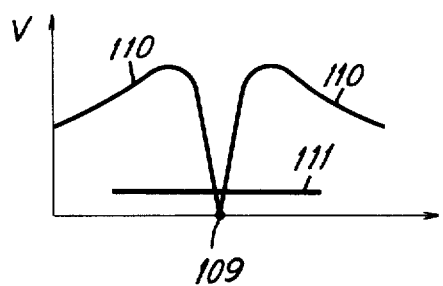
FIG. 7b is a graph illustrating the operation of the structure of the invention.

FIG. 7b shows by way of a graph the relationship between the voltage, indicated at the ordinate, and the advance of the objective, indicated at the abscissa.

The curve 110 represents the output voltage of the adder means 106, namely, $$\sum_{k=1}^{7} \left| a_k - b_k \right|.$$

The straight horizontal line 111 of FIG. 7b represents the voltage $V_{DD} \cdot R_2/(R_1 + R_2)$. The point 109 where the curve 110 intersects the abscissa illustrates the point where the output voltage of the adder means 106 is zero during advance of the objective. In FIG. 7b, the curve portion situated to the left of the point 109 corresponds to a condition where the image which is to be focused is situated behind the proper focusing plane, whereas the point 109 illustrates the condition when proper focusing has been achieved, and the curve 110 to the right of the point 109 shows a condition where the focusing is too short, or in other words the image has been situated at the side of the predetermined plane opposite from the location indicated by the part of the curve 110 which is situated to the left of the point 109 in FIG. 7b. Progressing from the point 109 it will be seen that the degree of deviation from proper focusing increases, whereas excessive deviation from proper focusing results in a reduction of the voltage inasmuch as the output voltage difference of each pair of corresponding photoconductive elements drops under these conditions due to a reduction in the image contrast at the photoconductive elements.

Figure 8:
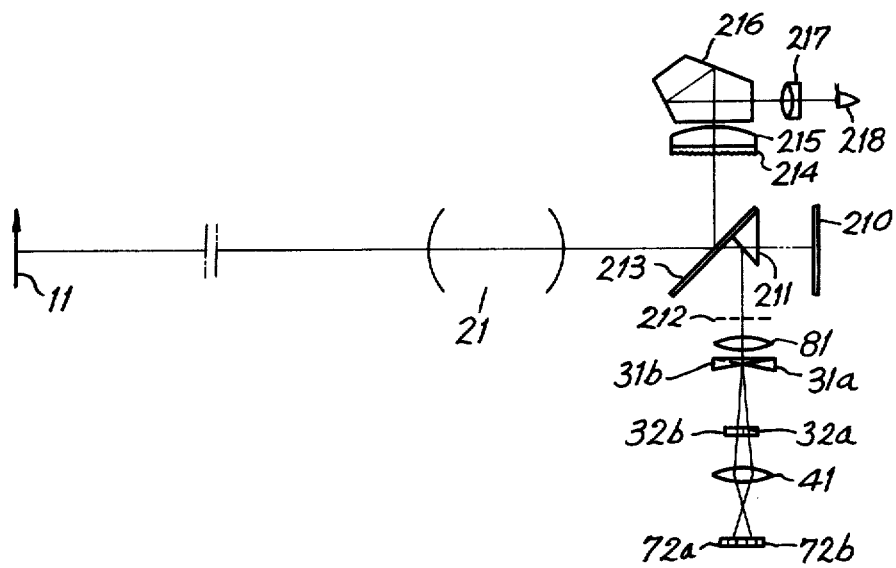
FIG. 8 is a schematic representation of the structure of the present invention as utilized in a single lens reflex camera.

FIG. 8 is a schematic illustration of how the focusing detector method and device of the invention is incorporated into a single lens reflex camera. The optical arrangement of the relay lens means 81, the refracting means formed by pair of split prism means 31a, 31b, on the other hand, and 32a, 32b, on the other hand, and the projector lens means 41 as well as the elongated detector means 72a, 72b are the same in FIG. 8 as illustrated in FIG. 5 and described above. It is to be noted that the position of the object 12, which was referred to as the object to be photographed in connection with FIG. 5, corresponds to the location of the image plane 212 shown in dotted lines in FIG. 8. This image plane 212 corresponds optically to and is the equivalent of the film plane 210. In FIG. 8 the object to be photographed is represented by the arrow 11 while the schematically illustrated camera includes the objective 21 as well as a semitransparent mirror 213 which carries at its rear upper portion a totally reflecting mirror 211 which receives light which has travelled through the mirror 213 and directs this light along the optical axis where the components of the invention are situated. Thus, the mirror 211 forms a means for directing along the optical axis where the components of the invention are situated an image corresponding to the image which is directed by the objective 21 onto a predetermined plane formed by the film plane 210. Thus, when the objective 21 has been set to situate a given image reflected from the means 211 at the image plane 212, this given image will be situated at the same optical location as the image directed by the objective means 21 to the film plane 210. Thus in the above example where the objective was considered as being fixed and the object was moved along the optical axis, it will be seen that the situation corresponds to that of FIG. 8 where a given image reflected by the means 211 is moved with respect to the image plane 212. Thus the means 211 will direct the light and the above given image to the optical system of the invention. The semitransparent mirror 213 of course reflects the image from the objective 21 to the viewfinder means which includes the focal plane 214, the condenser lens 215, the pentaprism 216, the ocular 217, with the eye of the operator being shown at 218 in a schematic manner.

The outputs from the photoconductive element trains 72a, 72b $$\sum_{k=1}^{7} |a_k - b_k| = 0$$

in a condition of proper focusing, which is to say in the condition where the given image is situated in the image plane 212, whereas the outputs of these detector means 72a, 72b is $$\sum_{k=1}^{7} |a_k - b_k| \neq 0$$

in a condition where the image reflected from the means 211 is situated before or behind the plane 212. Thus this relationship may be utilized for effective detection of focusing.

Figure 9:
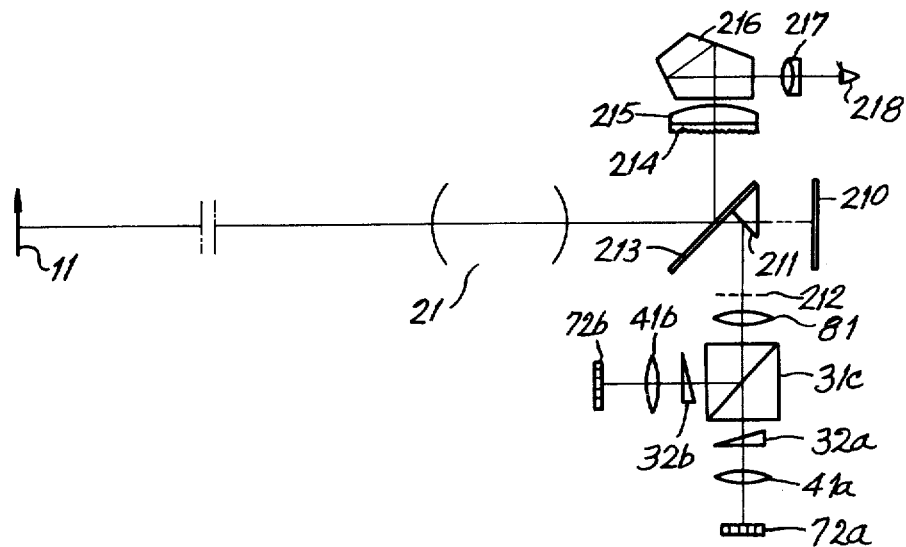
FIG. 9 is a schematic illustration corresponding to that of FIG. 8 but showing how the structure of the invention can take a form which is not as advantageous as that of FIG. 8 if certain elements are used instead of corresponding elements shown in FIG. 8.

FIG. 9 schematically illustrates the same structure as FIG. 8, except that in FIG. 9 a semitransparent known mirror 31c is utilized as a beam splitter. The structure of FIG. 9 is arranged to achieve the same results as that of FIG. 8 while utilizing the semitransparent mirror 31c instead of the refracting means formed by the prisms 31a, 31b. Thus it will be seen that with the arrangement of FIG. 9 the semitransparent mirror 31c reflects one image through the prism 32b and the projector lens 41b to be received by the detector means 72b, while the other image is transmitted through the mirror 31c to be received by the other prism 32a and projected by the lens 41a to the other detecting means 72a. As has been pointed out above, with such an arrangement it is difficult to provide a practical device in view of the several disadvantages resulting from the use of a semitransparent mirror 31c. Thus it will be seen that the resulting structure is quite large, requiring much more space than that of FIG. 8, and in addition there is no possibility of forming identical images to be received by the pair of detecting means 72a, 72b. In addition there are technical difficulties in connection with manufacturing the semitransparent mirror 31c with the required precision, and in addition there are unavoidable luminance or light losses and an unavoidable reduction in accuracy.

It is to be noted that the ability of splitting the light path to achieve the separate images of the invention is not affected even if the split prisms 31a, 31b and the relay lens means 81 are reversed with respect to each other in the device of the invention. Furthermore, the prisms 31a, 31b shown in FIGS. 3 and 4a may be vertically spaced from each other, and in this way the relative luminance or light intensity of the split images 61a, 61b may be varied so as to adjust the light intensity or luminance. Furthermore, the prisms 31a, 31b may be displaced from each other in order to adjust the mutual spacing of the images 61a, 61b.

Moreover, the output signal of the indicating means or signal processing circuit may be utilized as an input for driving a servo mechanism by means of which the focusing adjustment can be automatically achieved. Also the output signal may be utilized to operate a light display means such as a lamp so that it is possible in this way to indicate visually when proper focusing has been achieved. The above-described method and apparatus of the invention achieves a number of advantages. Thus the components of the device according to the present invention are limited only to lenses, prisms and photoconductive elements, so that the device of the invention can be manufactured in a compact size and with a light weight. In addition, the structure of the invention includes relatively few components which tend to consume a large electrical power, so that the structure of the invention can operate with a low level of power consumption. Furthermore, operation to achieve proper focusing can be carried out with high speed and with a high degree of detection sensitivity, primarily because image deviation is utilized for detecting proper focusing. Such rapid operation for focus detection is facilitated also by the fact that silicon photodiodes, compound semiconductors, charge transfer elements or image sensors of a self-scanning type can be utilized as the photoconductive elements. Furthermore, the split prisms are used as light path splitters according to the present invention, achieving in this way a simplified arrangement while eliminating any adverse effect of polarization and bringing about an adjustment of luminance to which the photoconductive element trains are exposed, these highly desirable effects being easily achieved with the structure of the invention. Specifically, the luminance which is to be detected by the photoconductive element trains 72a, 72b can be adjusted by vertically displacing the prisms 31a, 31b. The luminance loss of the optical system of the invention is small at the focusing detector of the invention, and this advantage results also in a high sensitivity of the detection. Finally, the device of the invention can be utilized not only in cameras but also in other optical apparatus such as enlargers, slide projectors, and motion picture projectors.

What is claimed is:

1. In a photographic apparatus having an objective and a device for determining when the objective has focused an image in a predetermined plane, said device comprising an optical system having a single optical axis extending only along a single straight line, said optical system having along said optical axis thereof an image plane normal to said optical axis and in which a given image is situated when the objective has properly focused an image corresponding to said given image in said predetermined plane, said optical system having along said optical axis spaced from said image plane a detecting plane which is also normal to said optical axis and including in said detecting plane a pair of identical elongated photosensitive detecting means which have respectively optically equivalent positions with respect to said optical axis, each of said detecting means providing an output which varies as an image is moved longitudinally along each detecting means, and optical means situated along said optical axis between said image plane and detecting plane for transmitting, when said given image is in said image plane, a pair of identical separate images, each of which is derived from said given image, respectively to identical positions along said pair of detecting means, and said optical means displacing the identical images transmitted to said pair of detecting means in opposite directions, respectively, along said pair of detecting means as said given image is displaced with respect to said image plane, so that the outputs of the said pair of detecting means will be different if said given image is before or behind said image plane along said optical axis while the outputs will be the same if the latter image is situated in the said image plane, said optical means including a relay lens means and a projector lens means spaced from each other along said optical axis with said relay lens means being situated nearer to said image plane than said projector lens means, said relay lens means receiving said given image from said image plane and transmitting said given image toward said projector lens means while the latter projects said identical images toward said detecting plane, and said optical means further including between said relay lens means and projector lens means a refracting means for receiving said given image from said relay lens means and for providing from said given image said pair of identical images which are transmitted by said refracting means to said projector lens means to be projected thereby to said detecting plane, said refracting means including a pair of prism means spaced from each other along said optical axis with one or said pair of prism means being situated nearer to said relay lens means than the other of said pair of prism means, said one of said pair of prism means acting on an image received from said relay lens means to provide from the latter image a pair of identical images which are in line with each other, and which are situated in the plane of the other of said pair of prism means, and said other of said pair of prism means acting on the pair of in-line identical images received thereby to arrange said identical images received thereby into a pair of identical images which are parallel and spaced from each other, said projector lens means receiving from said other of said pair of prism means said parallel identical images to project said identical images respectively to said pair of detecting means at said detecting plane, and indicating means operatively connected with said pair of elongated detecting means for indicating when the identical images transmitted by said optical means to said pair of detecting means are respectively situated at identical positions therealong, for thus determining when the objective has been set to focus an image in said predetermined plane.

2. The combination of claim 1 and wherein said pair of prism means are of substantially the same construction but are angularly oriented so as to be displaced about said optical axis by an angle of 90° one with respect to the other.

3. The combination of claim 2 and wherein each of said pair of prism means includes a split prism assembly having a pair of identical prisms respectively oriented oppositely with respect to each other.

4. The combination of claim 1 and wherein each of said detecting means includes a linear train of photoconductive elements.

5. The combination of claim 4 and wherein said photoconductive elements all have identical shapes and areas with each photoconductive element of one train forming one of a pair of corresponding photoconductive elements with a corresponding photoconductive element of the other train.

6. The combination of claim 5 and wherein said photoconductive elements are respectively in the form of image sensors of a self-scanning type.

7. The combination of claim 5 and wherein said photoconductive elements are in the form of photodiodes.

8. The combination of claim 5 and wherein said indicating means includes a pair of analog shift registers respectively connected operatively with said trains of photoconductive elements.

9. The combination of claim 8 and wherein said analog shift registers each includes a series of charge transfer elements respectively connected electrically to the photoconductive elements of each train.

10. The combination of claim 9 and wherein said indicating means further includes a photosensitive means for responding to light, a clock generator connected to the latter photosensitive means for receiving an output therefrom and for providing a clock frequency modulated according to the intensity of the light received by the latter photosensitive means, said clock generator being operatively connected to said analog shift registers for driving the same, a differential amplifier means operatively connected to said shift registers for respectively receiving outputs therefrom, an absolute value circuit means connected to said differential amplifier means for receiving an output therefrom and for converting said output into a corresponding absolute value, an adder means connected to said absolute value circuit means and said clock generator means for providing an addition of the output from the absolute value circuit means in synchronism with the clock generator, and a comparator means having a pair of inputs one of which is connected to said adder means for receiving an output therefrom, a constant voltage source means being electrically connected with the other of said inputs of said comparator means.

11. The combination of claim 1 and wherein said indicating means cooperates with said pair of detecting means for determining the difference between the outputs thereof, so that when the latter difference is zero, an image is properly focussed by said objective.

12. The combination of claim 1 and wherein the photographic apparatus is a single lens reflex camera while said predetermined plane is a camera film plane in which the objective is to focus an image of a given object, said camera including a semitransparent mirror situated between the film plane and the objective, and means situated at said mirror for directing an image therefrom along said optical axis, said image plane having along said optical axis a position corresponding to that of said film plane along a second optical axis which coincides with an optical axis of the objective.

13. The combination of claim 12 and wherein the camera includes a viewfinder means for receiving an image reflected from the semitransparent mirror, and said means for directing an image along said first-mentioned optical axis being situated behind said semitransparent mirror to receive an image which has travelled therethrough and directing the latter image along said first-mentioned optical axis.

14. The combination of claim 13 and wherein said first-mentioned optical axis and second optical axis are perpendicular to each other.

* * * * *